(12) United States Patent
Rodrigues et al.

(10) Patent No.: US 6,400,957 B1
(45) Date of Patent: Jun. 4, 2002

(54) WIRELESS PHONE-LINE INTERFACE

(75) Inventors: Sunil Rodrigues, Novato, CA (US); William Avery, Sparks, NV (US)

(73) Assignee: Smart-Tel LLC, Los Angeles, CA (US)

( * ) Notice: Subject to any disclaimer, the term of this patent is extended or adjusted under 35 U.S.C. 154(b) by 0 days.

(21) Appl. No.: 09/335,307

(22) Filed: Jun. 17, 1999

Related U.S. Application Data

(60) Provisional application No. 60/089,593, filed on Jun. 17, 1998.

(51) Int. Cl.$^7$ ................................................. H04Q 7/20
(52) U.S. Cl. ....................................... 455/462; 455/557
(58) Field of Search ................................ 455/462, 463, 455/464, 555, 554, 556, 557, 410, 411

(56) References Cited

U.S. PATENT DOCUMENTS

| | | | |
|---|---|---|---|
| 5,276,703 A | 1/1994 | Budin et al. | 375/1 |
| 5,282,238 A | 1/1994 | Berland | 379/58 |
| 5,479,480 A | 12/1995 | Scott | 379/59 |
| 5,483,576 A | 1/1996 | Staples | 379/58 |
| 5,509,050 A | 4/1996 | Berland | 379/58 |
| 5,544,222 A | 8/1996 | Robinson et al. | 379/58 |
| 5,550,861 A | 8/1996 | Chan et al. | 375/222 |
| 5,555,258 A * | 9/1996 | Snelling | 370/280 |
| 5,621,798 A | 4/1997 | Aucsmith | 380/25 |
| 5,657,371 A | 8/1997 | Suomi et al. | 455/418 |
| 5,678,562 A | 10/1997 | Sellers | 128/710 |
| 5,717,725 A | 2/1998 | Campana, Jr. | 375/347 |
| 5,722,066 A | 2/1998 | Hu | 455/403 |
| 5,722,076 A | 2/1998 | Sakabe et al. | 455/450 |
| 5,852,773 A | 12/1998 | Hu | 455/403 |
| 5,909,491 A | 6/1999 | Luo | 380/21 |
| 5,929,771 A | 7/1999 | Gaskill | 340/825.44 |
| 5,930,719 A | 7/1999 | Babitch et al. | 455/462 |

* cited by examiner

Primary Examiner—Vivian Chin
Assistant Examiner—J. Moore
(74) Attorney, Agent, or Firm—Cislo & Thomas LLP

(57) ABSTRACT

A wireless phone-line interface provides wireless communications between a modem and a switched telephone network. A wireless phone-line interface has a line interface transceiver coupled to a switched telephone network and a modem transceiver coupled to a modem. The modem may be coupled to computer, multimedia, or other electronic information equipment. The line interface transceiver and modem transceiver exchange wireless signals in reselected channels so that up-link and down-link frequencies transmitted and received by the line interface and modem transceivers are separate and distinct and do not interfere with one another. The cabling previously required between the modem and the switch telephone network is thereby eliminated, allowing easy relocation of the modem with its associated computer equipment to anywhere within the transmission range of the line interface and modem transceivers. The transceivers may be powered by DC-adapted 110 volt AC power. A telephone connected to the line interface transceiver may have priority for emergency conditions, usurping control of the associated telephone line for immediate access to the switched telephone network.

17 Claims, 9 Drawing Sheets ial No. 60/089,593 filed Jun. 17, 1998 which
WIRELESS PHONE-LINE INTERFACE

CROSS-REFERENCES TO RELATED APPLICATIONS

This application is related to U.S. provisional patent application serial No. 60/089,593 filed Jun. 17, 1998 which is incorporated herein by this reference thereto.

BACKGROUND OF THE INVENTION

1. Field of the Invention

This present invention relates to telecommunications interfaces for computers, multimedia equipment, and the like. More particularly, the present invention is directed towards a wireless phone-line interface whereby modem communications can occur locally over a wireless link between a modem-using or telephony device and a local telephone line.

2. Description of the Related Art

Over the past 25 years, the personal computer industry has rapidly developed in order to provide the beginning infrastructure for electronic communications and data exchange. With the rise of the computer industry, portable computing in the form of laptop computers, internet appliances, set top boxes and the like have become less expensive, easier to use, and highly portable. However, one of the great advantages of electronic information is the ability to exchange and transmit such information so it might be shared with other computers operated by other individuals.

In the past, a wire or cable of one sort or another was required to attach a personal computer or the like to a telephone line via a modem. The modem would electronically translate digital information presented to it by the computer into signals capable of being handled by then-existing telephone lines. The reverse was also true where telephone line signals coming into the modem could be translated into signals useable by the computer.

Having such a physical attachment in the form of a cable or wire between the phone-line socket and the modem of the computer is sometimes inconvenient, disadvantageous, or unavailable. Consequently, when a phone-line socket is available, it is desirable to have means by which modem communications can be effected between a computer and a telephone line without the use of a wire therebetween.

Present day electronic telecommunications do not provide for such a wireless link between the modem and the phone-line. What systems are available may generally be expensive and cumbersome, complicated, or difficult to use.

Consequently, it would be advantageous if there were available a wireless phone-line interface system that effected modem communications over a wireless link between a computer or multimedia equipment with a locally-available telephone line.

SUMMARY OF THE INVENTION

The present invention provides a wireless phone-line interface so that modem communications may be effected between a computer, multimedia equipment, or the like and a local telephone line. This phone-line interface system of the present invention comprises two detachably attachable units using modular RJ11 sockets and plugs or the like. Either or both units may powered through AC transformers or batteries.

The line interface transceiver, or line unit (LU), attaches to a local telephone line through a first RJ11 socket or the like. A second RJ11 socket or the like allows a telephone handset with dialer to connect to the phone-line central office through the transceiver.

The telephone handset has priority over the telephone line in case it needs to be used in an emergency or the like. The second module of the wireless phone-line interface is a modem transceiver, or modem unit (MU), that connects to a modem by an RJ11 socket and mimics the telephone line in order to properly interface with the modem. The modem may be connected to a computer, multimedia equipment, or the like through an RS-232 link, other connection protocol, bus, or the like. The line interface transceiver and the modem transceiver exchange radio frequency signals in order to effect communication between the modem and the phone line. The up-link frequency from the line interface transceiver to the modem transceiver is different from the down-link frequency from the modem transceiver to the line interface transceiver so that signals are kept distinct and apart.

By providing wireless communications between a computer modem or the like to an available phone line, the equipment associated with the modem is no longer "tied down" to the physical connection necessary between the modem and the phone line. Consequently, the equipment associated with the modem is free to roam about the local area that is most convenient or desirable for the person or persons using the computer, multimedia equipment, or the like. For example, a laptop may be physically located and moved throughout a large auditorium by means of the present invention. This is possible if the MU is battery powered. In one embodiment, the MU is attached to the power socket via the AC transformer unit which supplies low voltage AC source for subsequent rectification, filtering/regulation for DC required to power the circuits within the unit.

OBJECTS OF THE INVENTION

It is an object of the present invention to provide wireless communications between equipment associated with a modem and a telephone line.

It is another object of the present invention to provide such wireless communications in an easily effected manner.

It yet is another object of the present invention to provide a wireless phone-line interface system in the form of two modules, the first module providing the phone-line interface and the second module providing the modem interface.

It is yet another object of the present invention to provide wireless communications between modem-associated equipment and a telephone line that are two-way and full duplex.

It is yet another object of the present invention to provide wireless communication between the LU and a number of MUs trained (via a cloning function) to work with the particular LU These and other objects of and advantages of the present invention will be apparent from a review of the following specification and accompanying drawings.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention provides a wireless phone-line interface whereby modem communications can occur between a computer, multimedia, or other equipment and a locally available telephone or other communications line.

Figure 1:
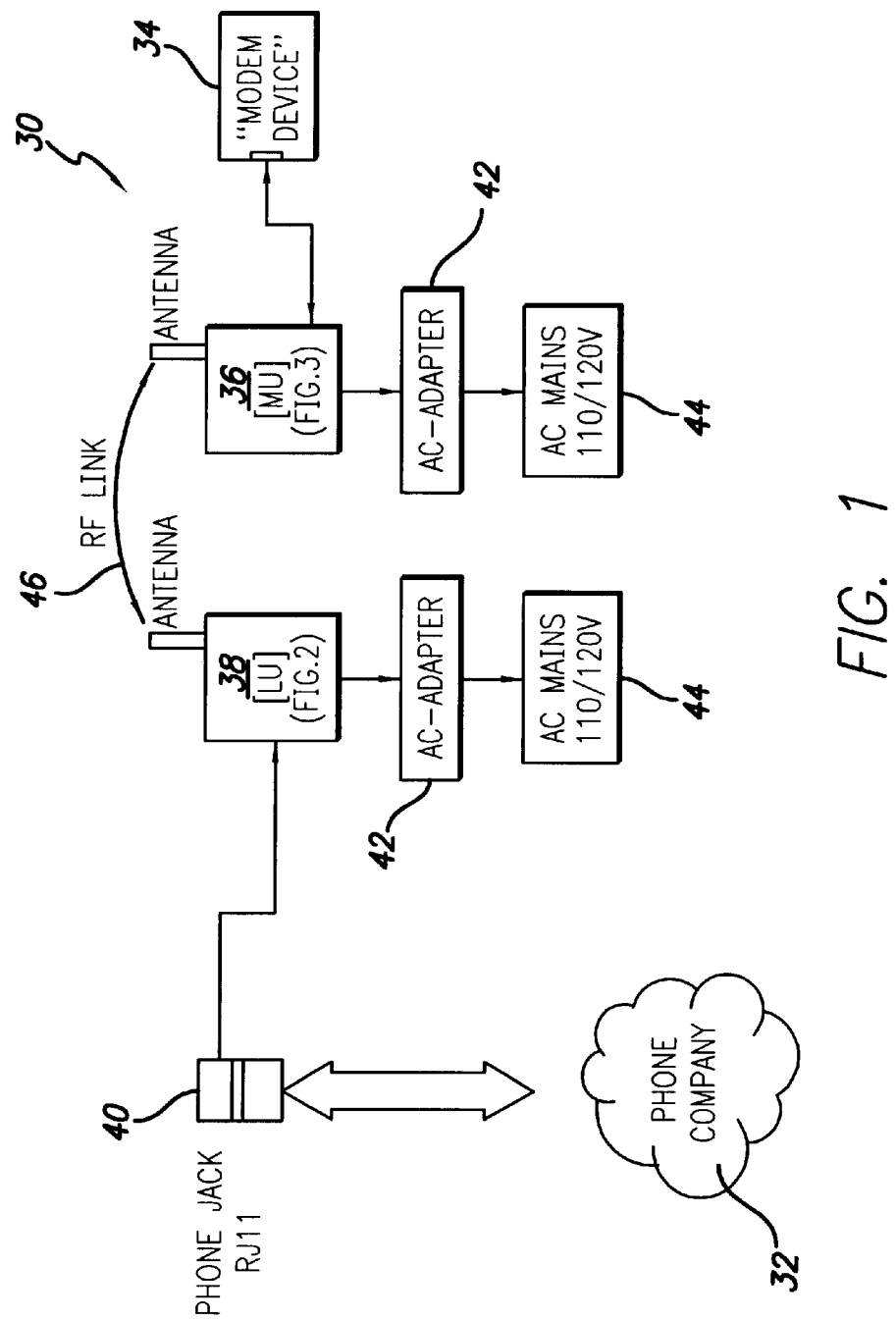
FIG. 1 is a general schematic diagram of the wireless phone-line interface of the present invention.
Figure 2:
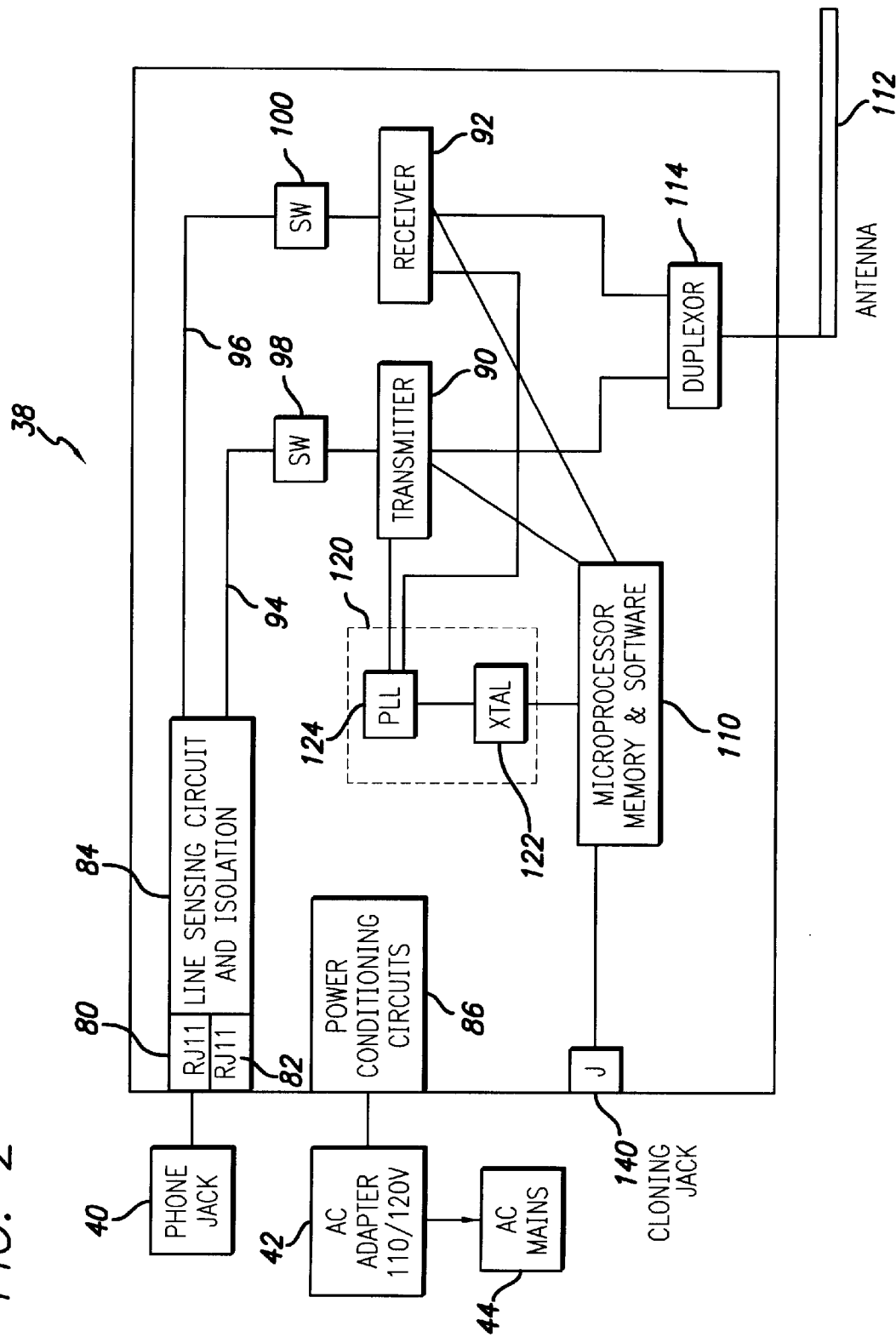
FIG. 2 is a block schematic component diagram of the line unit (LU) of the wireless phone-line interface of FIG. 1.
Figure 3:
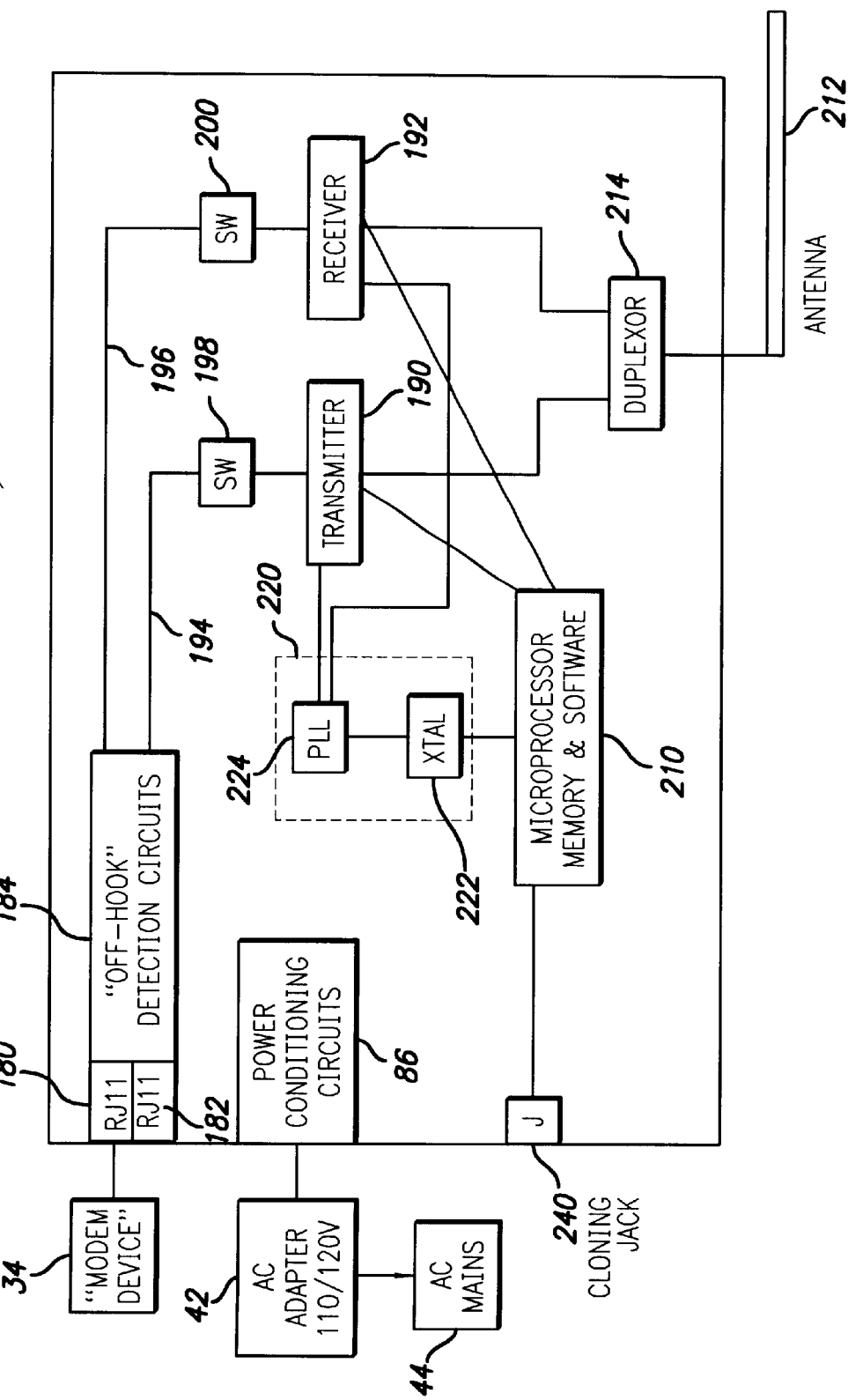
FIG. 3 is a block schematic component diagram of the modem unit (MU) of the wireless phone-line interface of FIG. 1.

As shown in FIGS. 1–3, one embodiment of the present invention 30 serves to bridge the gap between the phone company 32 (generally providing "plain old telephone service" or POTS) and a device using a modem, indicated by the "modem device" 34 in FIG. 1. The modem device 34 may be any number of devices that provide electronic data signals to a modem that would otherwise be able to communicate with a telephone company/TELCO/POTS 32. Consequently, one of the great advantages to the present invention is that it is easily used in conjunction with existing apparatus as it serves to provide a compatible wireless link or bridge between two previously compatible devices or systems.

A modem device 34 is coupled to the modem unit, or MU, 36. The internal components of the MU are shown in FIG. 3. The MU 36 transmits and receives signals to and from the line unit (LU) 38. The LU is shown in greater detail in FIG. 2. The LU 38 is coupled to the phone company 32 through a phone line and an RJ11 or other phone jack 40. Both the LU 38 and the MU 36 may use AC adapters 42 connected to AC power supplies 44 in order to supply the MU 36 and LU 38 electric power. In an alternative embodiment, either or both of the MU 36 and the LU 38 may be battery powered. The signal exchange for communication between the MU 36 and the LU 38 is indicated by the RF link 46, which exists during the transmission and reception (transception) of the signals between the MU 36 and the LU 38.

Via the wireless phone-line interface system 30 of the present invention, the modem device 34 communicates seamlessly with the phone company 32 via the MU 36 and the LU 38. As the interface units 36, 38 generally rely upon the radio frequency representations of the acoustic signals generated by the modem device 34 and received from the phone company 32 and vice versa, the wireless phone-line interface system 30 of the present invention becomes an extension of the link between the modem device 34 and the phone company 32.

The line unit (LU) 38 and the modem unit (MU) 36 are shown in FIGS. 2 and 3, respectively. The relative linking connection and coupling between the individual components present within each unit are shown as well.

Beginning first with FIG. 2, the LU 38 is connected to the phone jack 40 by a cable connecting to an RJ11 or other phone jack 80. A cable, or otherwise, terminating in an appropriate end, may snap-fit into the RJ11 jack 80. A second RJ11 jack 82 provides an additional port through which an additional RJ11 male terminator may fit. The second RJ11 jack 82 is intended for a use with a telephone, so that the line unit 38 does not deprive the use of a telephone socket, even though the line unit 38 is in place at that socket.

FIG. 2 shows a line sensing and isolation circuit 84 coupled to both RJ11 jacks 80, 82. The line sensing and isolation circuit 84 couples the two RJ11 jacks 80, 82. In so coupling the two RJ11 jacks, the line sensing and isolation circuit 84 provides a means by which emergency use of a telephone connected to the second RJ11 jack 82 may be provided. The line sensing and isolation circuit 84 senses and isolates the telephone line so that the telephone connected at the second RJ11 jack 82 has priority over all other communications through the LU 38. The line sensing and isolation circuit 84 can detect whether or not any telephone connected to the second RJ11 jack 82 is off hook. When such a telephone is off hook, it is in use as the telephone handset has been taken off hook from the cradle. Under such circumstances, the line sensing and isolation circuit 84 assumes or delivers priority to the telephone. In this way, even though the line unit 38 is exchanging radio frequency signals with the modem unit 36, the telephone is kept in service. This is particularly useful when emergency conditions arise, as generally modem signals cannot be delivered to emergency or other authorities in order to summon aid. However, a telephone can do so and by maintaining the availability of the telephone through the second RJ11 jack 82, aid can be summoned readily as by dialing 911 or otherwise.

When a modem or modem device 34 is directly attached to phone jack 40, establishing a link to the telephone system, the signals generated by the modem are modulated digital or binary signals that are de-modulated by a corresponding modem on the other side of a telephone line connection. Consequently, modems resolve the translation from digital signals to analog to digital, in order to allow two electronic information machines (e.g., computers) to communicate over phone lines. In fact, this characteristic feature of modems gave rise to their names, as modems both modulate and de-modulate.

Modems modulate the binary or digital signals into audio frequency analog signals and transmit them to the telephone line. When the modem receives such modulated signals, it de-modulates them and converts the audio frequency analog signals back to binary or digital signals readable by a computer or the like.

The present invention maintains the audio nature of the modulated signals. Consequently, and by inspection of FIGS. 2 and 3, it can be seen that there is a striking similarity between the designs of both the line unit 38 and the modem unit 36. Generally, the only difference is the connection to the pertinent system. For the line unit 38, the pertinent system is the telephone service or phone company 32 made available with the phone jack 40. For the modem unit 36, the pertinent system is the modem device 34. As both the line unit 38 and the modem unit 36 handle the same types of signals, their internal structure is similar and it is advantageous to use the most efficient or best system for each side of the connection, as they both use the same signal. Due to the similarity of the individual units 36 and 38, the description of one unit, such as the line unit 38, may be entirely applicable to the modem unit 36, and vice-versa.

As can be seen from FIGS. 2 and 3, the two units 36 and 38 generally share similar oscillator, transmitter, receiver, and control circuitry. Also, the power conditioning circuits 86 may be highly similar, if not identical, should the line and modem units 38, 36 operate in the same voltage regimes.

As shown in FIG. 2, the line sensing and isolation circuit 84 is connected to a transmitter 90 and a receiver 92 via a respective transmitter line 94 and a receiver line 96. Software control or switches may be used in order to control the signal flow to the transmitter 90 and the receiver 92. A transmitter software control or switch 98 is in line between the line sensing and isolation circuit 84 and the transmitter 90. Similarly, a receiver software control or switch 100 is in line with the receiver line 96 between the line sensing and isolation circuit 84 and the receiver 92. Both of these switches 98, 100 are controlled by the microprocessor 110 with its accompanying memory and software. The software controls 98, 100 serve to control the signals and flow of signals sent and received by the transmitter 90 and receiver 92 over the phone line via the phone jack 40.

In an alternative embodiment, the line sensing and isolation circuit 84 may also be coupled to the microprocessor 110 and the software controls 98, 100 in order to terminate signal travel from the transmitter 90 and the receiver 92 to the phone line/phone jack 40. In such an embodiment, lifting the handset from a telephone connected to the second RJ11 jack 82 causes the line sensing and isolation circuit 84 to signal the microprocessor, which in turn severs the connection between the transmitter and receiver 90, 92 with the line sensing and isolation circuit 84. The telephone then has absolute use of telephone line 40 in order to summon aid or to otherwise place a call.

The line unit transmitter 90 and receiver 92 may correspondingly send and receive, respectively, radio frequency signals. As is known in the art, audio signals or the like are generally added to a high frequency carrier wave as the two signals add together. When combined, the high frequency of the carrier wave predominates over the lower frequencies of the audio signal. However, the high frequency carrier wave is easily filtered out. When the high frequency carrier wave is filtered out, the lower frequency audio signal remains generally intact and preferably with little introduction of noise.

The transmitter 90 generally takes whatever signals are impressed upon it and sends them out to the antenna 112. These signals are then radiated for pick-up by the modem unit 36. Similarly, the receiver 92 uses the antenna 112 to pick up radio frequency signals, filtering out a preset or other carrier wave. So that the transmitter 90 and receiver 92 may share the same antenna or otherwise, a duplexor 114 receives signals from the transmitter 90 and transmits signals to the receiver 92. The duplexor 114 serves to keep isolated the signals between the transmitter 90 and the receiver 92, so that the receiver 92 does not receive the signals transmitted by the transmitter 90, but instead picks up the signals received by the antenna 112. Additionally, in order to ensure that the signal sent by the transmitter 90 and the signals received by the receiver 92 are kept separate and apart, different frequencies are used by which to transmit and to receive.

Generally, it is known in the art that the transmitter may transmit at a frequency of approximately 46 megahertz, while the receiver may receive signals centered upon 49 megahertz. In a preferred embodiment, the signals transmitted and received are frequency modulated. Alternative frequency bands include the 900 megahertz band and the 2.4 gigahertz band. The particular band frequency band is not seen as being a particular limitation of the present invention so long as the appropriate transmission and reception can be made between the modem 34 and the phone line 40. Generally, neither the modem 34 nor the phone jack 40 sees the wireless phone line interface system 30 of the present invention as it acts merely to bridge the uncabled distance between the phone line 40 and the modem device 34.

In order to provide a carrier signal, an oscillation circuit 120 transmits the carrier wave appropriate for each of the transmitter 90 and receiver 92. One means by which such an oscillation circuit 120 can be achieved is by using a crystal oscillator 122 in conjunction with a phased lock loop (PLL) 124. This provides for a very consistent, clear and well-defined carrier signal for the transmitter 90 and the receiver 92. The crystal oscillator 122 may transmit an oscillating signal to the phase lock loop 124, which in turn transmits its signal(s) to the transmitter 90 and the receiver 92.

The crystal 122, as well as the transmitter 90 and the receiver 92, may be controlled by the microprocessor 110. The crystal 122 may have its frequency adjusted, altered, sensed and/or controlled by the microprocessor 110. Memory associated with the microprocessor may provide means by which constants, variables, and data may be stored temporarily or in a more permanent fashion. Additionally, instructions for the microprocessor in the form of software may be used to control the operation of the line unit 38. Such software may be updated from time to time, as optimization, efficiencies, and greater advantages are developed in the art.

As the line unit 38 picks up any signal that it receives upon the receiver's 92 designated frequency, it becomes a consideration to ensure that the signals are ones from a valid or intended modem unit 36 and not some rogue or cloned modem unit. Likewise, the line unit 38 transmits its signals without limitation to the intended modem unit 36. Instead, any modem unit in the area that is tuned to the transmitters 90 frequency may pick up transmissions from the line unit 38.

Consequently, due to the available nature of the signals sent and received by the line unit 38, it becomes important to provide some means by which the signals may be secured from cloned units that might eavesdrop upon the communication between line and modem units 38, 36 of the present invention.

FIG. 2 shows a cloning jack J/140 that receives a cable linking a modem unit 36 (via its cloning jack) to the line unit 38. When so connected, the line unit 38 can recognize, identify, and distinguish a particular modem unit 36.

In one embodiment, when a line unit 38 is powered up, a line unit may determine whether or not a connection is present at the cloning jack J/140 with the modem unit 36. If so, the microprocessor 110 implements an anti-cloning procedure that transfers address relationships between the line unit 38 and one of perhaps several modem units 36. If a cloning connection is detected, the line unit 38 initiates the transfer of an address in the line unit 38 to the modem unit 36. The modem unit 36 stores this information in non-volatile memory (as in electronically erasable read-only memory, or EEROM). This makes illegal cloning more difficult, much in the same way cloning is made more difficult for cordless phones. A single line unit 38 can then be used with a number of modem units 36 with a greater measure of security and privacy.

Turning now to FIG. 3, the similarities mentioned previously between the line unit 38 and the modem unit 36 may be seen in greater detail. Both units have software controls, transmitters, receivers, duplexors, microprocessors (with memory and software) and oscillation circuits in the form of oscillating crystals driving PLL's. Similar connections are present such that the microprocessor is connected or coupled to the transmitter, the receiver, the oscillating crystal, and the cloning jack. The transmitter and the receiver are both coupled to the duplexor which in turn is coupled to the antenna.

For purposes of convenience and better understanding, the elements in the modem unit 36 corresponding to similar elements in the line unit 38 are generally given the same reference number augmented by 100, so that for example the cloning jack of the modem unit 36 is 240, while that of the line unit 38 is 140.

The modem unit 36 generally operates in a manner similar to that of the line unit, save that instead of a line sensing and isolation circuit 84, off-hook and line detection and control circuits 184 are present. The off-hook detection circuits 184 are connected to the modem device 34 via a cable and RJ11 jack 180. In one embodiment, a second RJ11 jack 182 may be present in the modem unit 36, allowing the connection of a telephone line. With respect to this second RJ11 jack 182, the same "911" or emergency protection circuit may be available such that if the handset is lifted or the second RJ11 jack 182 is otherwise put into use, all other transmissions over the wireless phone line interface system 30 of the present invention cease, dedicating the use of the line to the telephone connected to the second RJ11 jack 182 and the modem unit 36. If telephones connected to both the modem unit 36 and the line unit 38 are in use, generally the line unit 38 telephone would prevail. However, modification to the software processing and the microprocessor control of the line and modem units 38, 36 may allow the modem unit telephone via its connection at the second RJ11 jack 182 to prevail. While the modem unit 36 and the line unit 38 are basically the same, different embodiments may exist according to the different frequency regimes used to transfer information between the line and modem units 38, 36.

For example, in 900 megahertz and 2.4 gigahertz units, the 911 condition (allowing telephone seizure of the line) may not be present and no uninterruptable link between the second phone line jack of the line unit 38 may be present in connection with the phone jack/ phone line 40. Additionally, the higher frequency units may only accept dial tone input from the modem device. In other embodiments, the line and modem units will operate identically in the higher frequency regimes as they do in the lower 46–49 megahertz regime.

When the wireless phone line interface 30 of the present invention is powered up, power is supplied at 12 volts D.C. through the power conditioning circuits 86. When the modem unit 36 is first turned on, it begins scanning its channels, generally 10–25 in number, in order to find a clear channel. Once the modem unit 36 finds a clear channel (possibly establishing this in tandem with the line unit 38), the modem unit 36 locks onto this channel and goes into a standby condition waiting for the modem device to go off hook, or possibly an in-coming modem call from the line unit 38.

Once the line unit 38 is turned on, it looks for a connection with the modem unit 36 via the cloning jack 140. If a connection is present at the cloning port 140, the line unit 38 interrogates the attached modem unit 36. If the modem unit 36 responds, the line unit 38 initiates a transfer of an address in the line unit 38 to the modem unit 36. This address information is stored by the modem unit 36 in non-volatile memory such as electronically erasable read-only memory (EEROM). By transferring the address information from the line unit 38 to the attached modem unit 36, it becomes more difficult to illegally clone modem units and to electronically eavesdrop on the communications exchanged between the line unit 38 and the modem unit 36. Additionally, the cloning process enables a single line unit to be used with a multiple number of modem units 36 in a single unit. On subsequent power ups, the line unit 38 looks for the modem unit 36 on the cloning port 140. If there is no connection at the cloning port 140, the line unit does not look for the modem unit 36 again and maintains the status quo until the line unit 38 is powered up or turned on with a connection established at the cloning jack 140.

Once the line unit 38 finishes the cloning detection process, the line unit 38 scans the available channels (generally 10–25 channels) to find a clear signal coming from an associated modem unit 36. If the line unit 38 finds such a signal from any modem unit 36 on any channel, the line unit 38 stops at that channel and checks to see of the address transmitted by the modem unit 36 matches the line unit's 38 address. If so, the line unit 38 locks upon this channel. If a signal with an improper address is detected, a signal could be given by the line unit 38 in the form of an alarm or the like that possible cloning has occurred or that electronic eavesdropping may be taking place. However, due to the widespread use of cordless and cellular phones, the signal may be one that is associated with a different and good faith communication. If there are multiple modem units 36 operating, they are serviced by the line unit 38 on a first active, first serve basis.

In one embodiment, the line unit 38 checks the normal voltage condition (generally greater than 20 volts between the tip and ring lines) of the phone jack connection 80, to ensure that a proper connection can be established by the line unit 38 with the phone line. If a low voltage condition occurs where the voltage across the tip and ring lines is less than 20 volts, the line unit 38 will not go off hook even when commanded by the line unit 36. An error message could be returned by the line unit 38 to the modem unit 36 under such circumstances. Generally, the low voltage condition occurs if the line is already in use by another phone. This ensures priority to the telephone connected at the second RJ11 port 82, particularly useful for 911 calls made by the telephone and the like as the use of the telephone will not be blocked by the line unit 38.

Once the modem unit 36 and the line unit 38 have been turned on and are fully powered up, the modem unit 36 is in standby condition, having locked onto the first clear channel. The line unit 38 has locked onto the signal from the modem unit 36, and both are awaiting activation. The modem unit 36 waits for the modem device 34 to go off hook. When the modem device does indeed go off hook, a loop current is sensed and the modem unit microprocessor 210 instructs the line unit 38 to go off-hook via the RF signal transmitted by the transmitter 190 over the modem antenna 212. The off-hook signal transmitted by the modem unit transmitter 190 is received by the line unit receiver 92.

For the line unit 38, once it has completed scanning its channels to establish a preliminary connection with the modem unit 36, it waits for the modem unit 36 to transmit its off-hook signal. Upon detecting the modem unit off-hook signal, the line unit 38 implements the command, if the voltage (greater than 20 volts) is normal. Otherwise, the voltage is below normal indicating use of the associated telephone.

When the line unit 38 goes off hook, the phone line/phone jack 40 presents a dial tone to the line unit 38. This condition is transmitted to the modem unit 36 via the line unit transmitter 90 via the line unit duplexor 114 and the antenna 112. This communication back from the line unit 38 allows the establishment of the full duplex audio path between the line unit 38 and the modem unit 36.

Having received the open line signal from the line unit 38, the modem unit 36 may transmit the dialing codes sent from the modem device 34 over to the line unit 38. The modem device 34 may dial a telephone number either by pulse dialing or by sending tones. Either of these may be detected by the modem unit 36. For tone dialing, the modem unit 36 may transmit those directly to the phone jack via the line unit 38. For pulse dialing, when a space is detected between digits, the modem unit 36 may operate a DTMF (dual tone multi-frequency) generator to send a DTMF tone code via the established RF link to the line unit 38. The line unit 38 receives the audio tones and transmits them to the phone company via the telephone line 40.

One reason for implementing a pulse dialing feature is to accommodate the low information rate present during the dialing process. The lowest possible signal-to-noise ratio may be required in converting pulse dialing to tone dialing eliminates the possibility of mis-dialed numbers. Upon the conclusion of the dialing process, the RF frequency audio path from the modem unit 36 to the line unit 38 is fully opened and established. In one embodiment of the wireless phone line interface system 30 of the present invention, the dialing process may be a store and forward process between the modem device 34 and the modem unit 36. However, real-time activity may be present between the modem unit 36 and the line unit 38 and similarly between the line unit 38 and the phone company 32.

Once the RF frequency links are established between the line unit 38 and the modem unit 36 (or multiple modem units 36), both sides of the RF link pass the encoded audio signals in both directions, making the RF link connection full duplex. With a full duplex connection across the RF link 46, the modem device 34 communicates directly with the phone line 40/phone company 32 in a transparent manner, until the modem unit 36 detects that the modem device 34 has gone on-hook. Alternatively, if the line unit 38 detects that another telephone in parallel with the modem unit 36 (namely the telephone connected at the second RJ11 jack 82) has gone off-hook, the line unit 38 immediately goes on hook and turns off its transmitter 90 to direct all signals and control to the telephone at the second RJ11 jack 82.

When the modem device 34 goes on hook, the modem unit 36 detects the end of the communication session. The modem unit 36 then transmits a session termination command to the line unit 38, allowing the line unit 38 to go back on hook. The RF link between the two units is extinguished, and the standby condition is re-initiated so that future communications may be established between the line unit 38 and the modem unit 36. When a 911 emergency condition arises through the use of the telephone connected to the second line unit RJ11 port 82, the line unit 38 detects this off-hook condition in the detached telephone and immediately goes on hook to sever the connection with respect to the modem device 34 to allow the attached telephone to use the phone line/phone jack 40.

Should a channel become busy due to interfering signals, the modem unit 36 will scan for a clear channel and stop in standby mode. Similarly, the line unit 38 is in standby mode when it is on hook and continuously scans its channels for prescribed modem unit signals, so that a ready RF link is available should communications be required between the modem device 34 and phone company 32.

As mentioned previously, even though the description above is directed to the modem device 34 dialing out to the phone company 32, circumstances could be such that another modem dials through the phone company 32 seeking the modem device 34. Under such circumstances, the telephone connected to the second line unit RJ11 jack 82 would ring. This could be ignored, and the line unit 38 could pick up the call after a pre-determined number of rings. The RF frequency link 46 may be established by the line unit 38 with the modem unit 36 in order to communicate with the modem device 34 much in the same way as the modem device 34 is described as communicating with the phone company 32.

The line unit antenna 112 and the modem unit antenna 212 generally depend upon the frequency band within which the two units operate. For the 46/49 megahertz unit, it is customary to use a telescopic or flexible "rubber ducky" antenna with a length relating to the frequency or wavelength of the RF link.

One special feature that may used with respect to the antenna is the incorporation of the antenna in the cable from the AC adapter. The mountable antenna may include a 19-inch RF radiator and may be made a part of the line cord connected to the AC adapter. Generally, the length of such an antenna is approximately three-tenths of one quarter of the wavelength or 3/40 ths of the wavelength. The length of the antenna must be a large enough fraction of the quarter wavelength in order to provide high enough radiation resistance to make the antenna an efficient RF radiator. The AC line cords establishing the power connection between the adapter and the modem unit 36 (or line unit 38, or otherwise) may be approximately three to five feet as required. The antenna length of 19 inches may be achieved by placing an RF attenuator, such as a ferrite core with the line cord threaded four times through to form a winding, which achieves the correct degree of attenuation to RF at that point. Such a scheme virtually provides a 19-inch radiator to the radio frequency transmissions and an open circuit beyond that length. A loading coil with capacitors may provide the coupling to the antenna, as well as isolation from DC along the RF lines. The DC path supplying power to the line and modem units 38, 36 may be superimposed on the line cord while suffering no additional resistance on the account of the imbedded RF choke.

Figure 4:
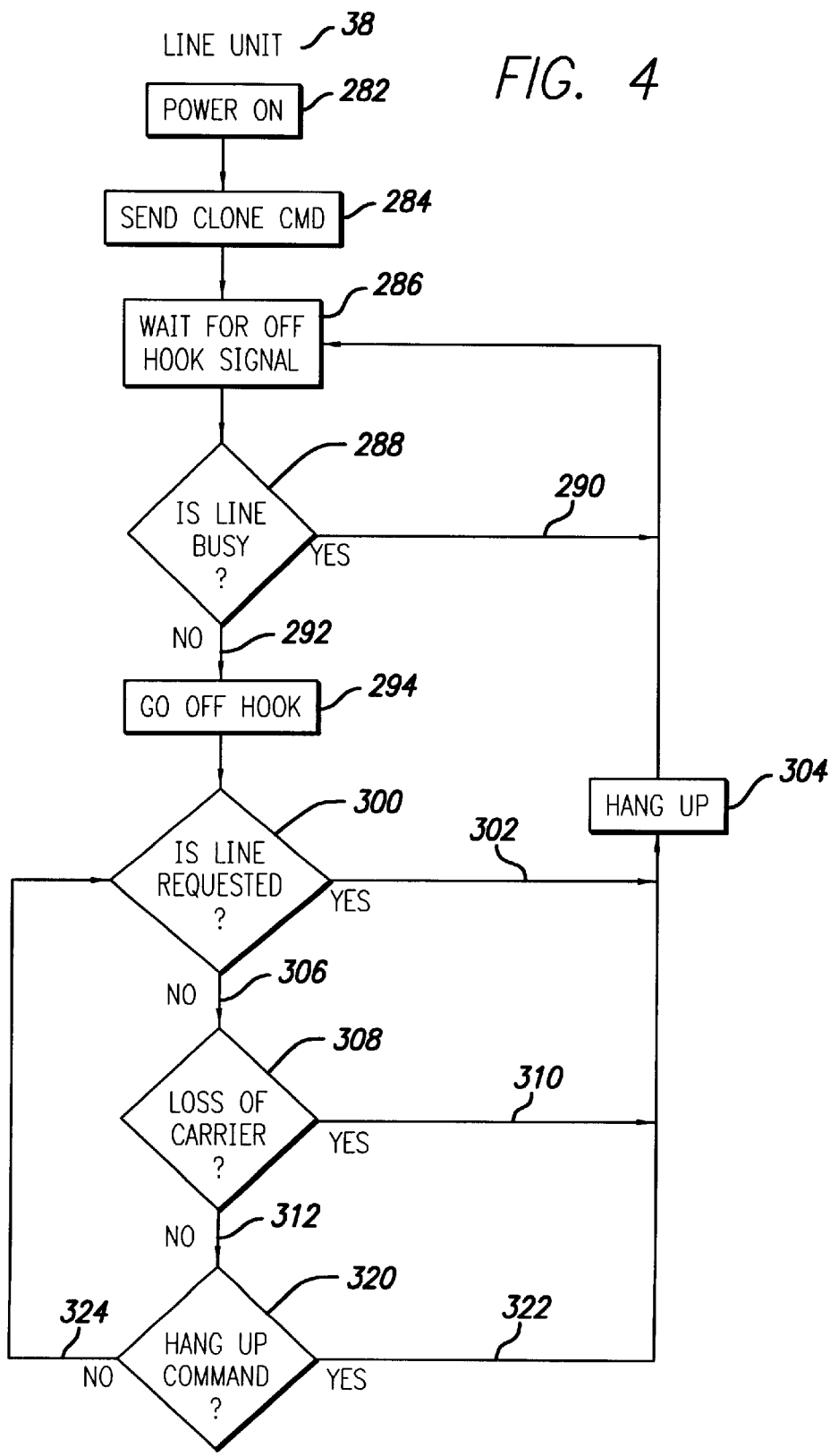
FIG. 4 shows a flowchart diagram for program flow control of the line unit of the present invention.

FIG. 4 shows a flowchart for a process by which the line unit 38 may effect its communications with the phone jack/phone line 40 in the modem unit 36. The line unit process 280 is initialized at power on 282. Upon power up 282, the line unit 38 sends a clone command inquiry 284 to the modem unit 36 as described above. Upon determining the clone status 284, the line unit 38 waits for an off-hook signal 286. If the line unit 38 receives an off hook signal, it tests to see whether or not the other phone line via the second RJ11 jack 82 is busy 288. If the line is busy 290, control of the instruction flows back to the status of waiting for the off-hook signal 286. If the line is not busy 292, the line unit 38 goes off hook 294. Once the line unit 38 goes off hook, it maintains its communication status with the modem unit 36, unless certain conditions occur as set forth further in the flow control 280 of the line unit 38.

Once the line unit 38 is gone off hook 294, it tests to see whether or not the line is requested through the second RJ11 jack 82 at step 300. If the line is requested 302, the line unit 38 hangs up 304 and returns to wait for the off-hook signal 286. If no line is being requested through the second RJ11 jack 82, the flow control 280 recognizes this at step 306 and tests to see whether or not there has been a loss of carrier 308. If there has been a loss of carrier 310, the line unit 38 hangs up 304 and returns to wait for the off-hook signal 286. Alternatively, if carrier has been maintained 312 and there is no loss of carrier, the line unit 38 tests to see whether or not it has received a hang up command 320.

If the line unit 38 has received a hang up command 322, the line unit 38 hangs up 304 and returns to wait for the off-hook signal 286. If no hang up command has been received 324, the connection is maintained to the phone jack/phone line 40 and the modem unit 36 and control of the line unit 38 is returned to see whether or not a line has been requested through the second RJ11 jack 82 at step 300.

So long as no interruptions are received, the on-line engaged mode of the line unit 38 passes from the request for the line 300 through to the loss of carrier inquiry 308 and on to the hang up command inquiry 320, control being passed back then to check to see whether or not the line has been requested 300. Exit from this loop is indicated as above, and the loop itself is generally indicated by reference 326.

Figure 5:
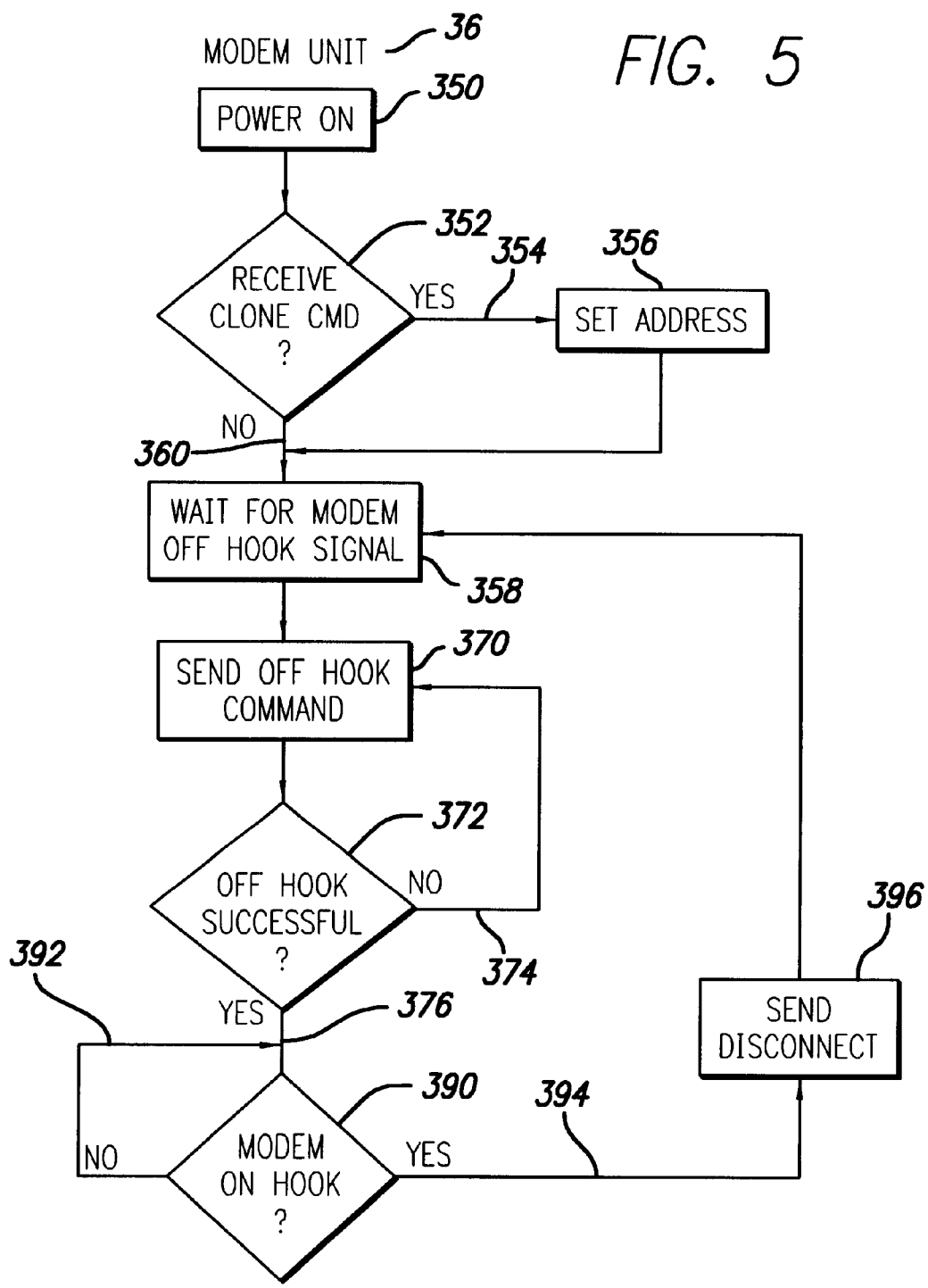
FIG. 5 is a flowchart diagram showing program flow control for the communication steps and operation of the modem unit.

As shown in FIG. 5, the modem unit 36 may also go through a similar control of program flow and operation 340. When the modem unit is originally powered on 350, it inquires as to whether or not it has received a clone command 352. If so, the address sent by the line unit 38 is set 354, and the modem unit 36 inquires as to whether or not it has received a clone command 352. If a clone command has been received 354, the modem unit 36 sets the address 356 transmitted by the line unit 38. The modem unit 36 then waits for a modem off-hook signal 358.

If upon querying as to whether or not the modem unit 36 has received clone command 352, and no such clone command has been received 360, no address is set 356 and control is delivered to the step where the modem 36 waits for the modem off-hook signal 358.

The process by which the modem 36 waits for the off-hook signal may be a query loop where the modem 36 continually polls the modem device to see whether or not an off-hook signal is present. The modem unit 36 may also poll the off-hook detection circuits 184 in order to achieve the same end.

Once an off-hook signal has been received, an off-hook command is sent to the line unit 38 in step 370. The modem unit 36 then inquires or establishes whether or not the off-hook command transmission operation 370 has been successful in step 372. If the off-hook command transmission has been unsuccessful 374, the modem unit 36 retransmits the off-hook command in step 370 with flow control then returning to query as to whether the off-hook command has been successful 372.

Once the off-hook command transmission has been successfully transmitted by the modem unit 36 and received by the step 376, the modem unit 36 polls the pertinent signals, registers, or the like to determine the status of the modem device 34 and whether or not the modem device 34 has gone back on hook 390. If the modem device 34 remains off hook 392, the status inquiry 390 of the modem device 34 is continuously repeated. Once the modem on-hook query 390 detects that the modem device 34 has actually gone on hook 394, the modem unit 36 sends a disconnect signal 396 to the line unit 38 and shuts down the transceiving operation at its transmitter 190 and receiver 192. Program flow to control is then transferred to step 358, where the modem device 36 waits for an off-hook signal from the attached modem device 34.

While FIGS. 1–5 show one embodiment of the present invention, FIGS. 6–9 show an alternative embodiment that may also provide advantageous operation and the provision of a wireless interface connector freeing up multi-media equipment or other devices from physical attachment to a phone line, phone jack or the like.

Figure 6:
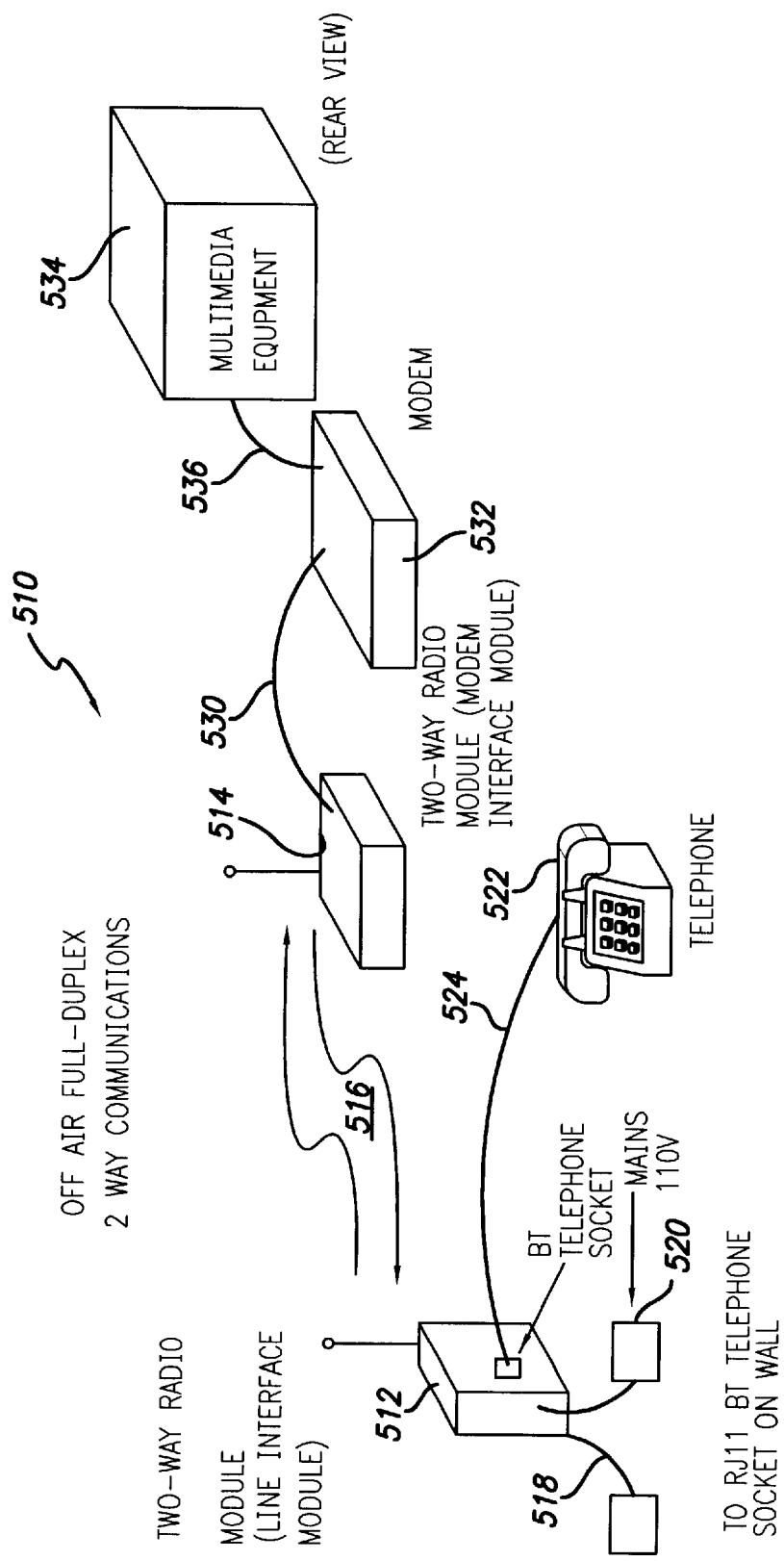
FIG. 6 shows a general schematic of an alternative embodiment of the wireless phone-line interface of the present invention. Wireless communications are effected between the line interface module and the modem interface module by means of a two-way full duplex radio connection.

As shown in FIG. 6, the wireless phone-line interface of the present invention 510 has a line interface module 512 and radio or other wireless communications with a modem interface module 514. The wireless communication occurring between the line interface module 512 and the modem interface module 514 is generally achieved by radio communications or the like indicated by the lines 516 extending between the modules.

A line interface module 512 is coupled via a copper or other wired cable to the local telephone jack, outlet, or the like by an RJ11 plug fitting into the RJ11 socket or otherwise. The connection between the line interface module 512 and the telephone line establishes the connection to the telephone line for the telephone connection line 518. The line interface module 512 is powered by an AC adapter 520, battery power, or the like, which ultimately supplies the line interface module 512 with the DC power at appropriate levels. A telephone 522 is connected by a phone-cable or the like 524 to the line interface module 512.

The modem interface module 514 is connected via a telephone cable 530 to a modem 532. The modem, in turn, is connected to computer, multimedia, or other electronic information equipment 534 via a modem cable 536 or the like. Hereinafter, such computer, multimedia, or other electronic information processing equipment are referred to generally as computer equipment. The modem 532 may be connected to the computer equipment via a modem cable 536 or other electronic connection of known or unique information exchange protocol, including those recognized by the IEEE.

Figure 7:
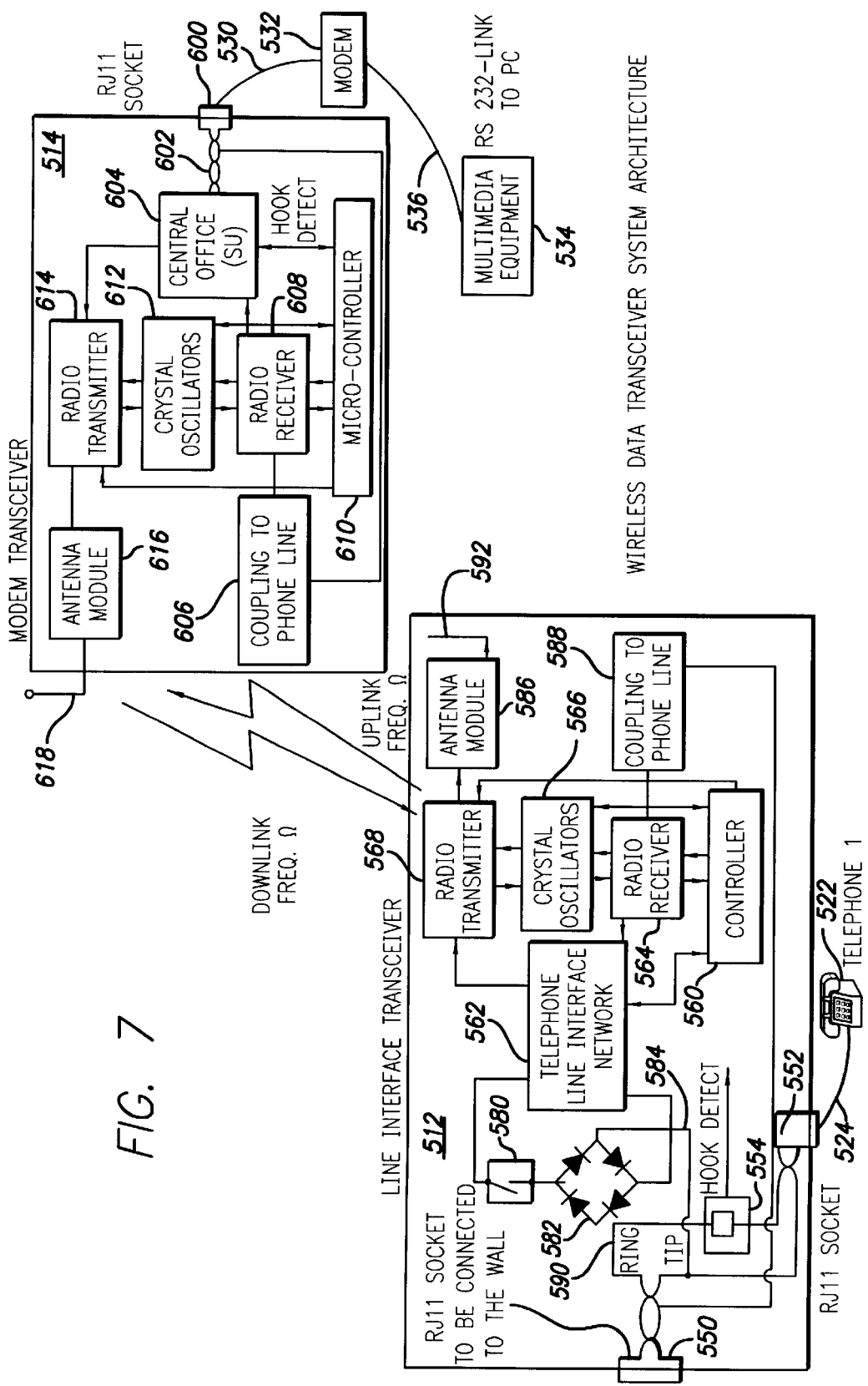
FIG. 7 shows a block diagram schematic of an alternative embodiment of the line interface transceiver and the modem transceiver showing the internal construction of the same using known components.
Figure 8:
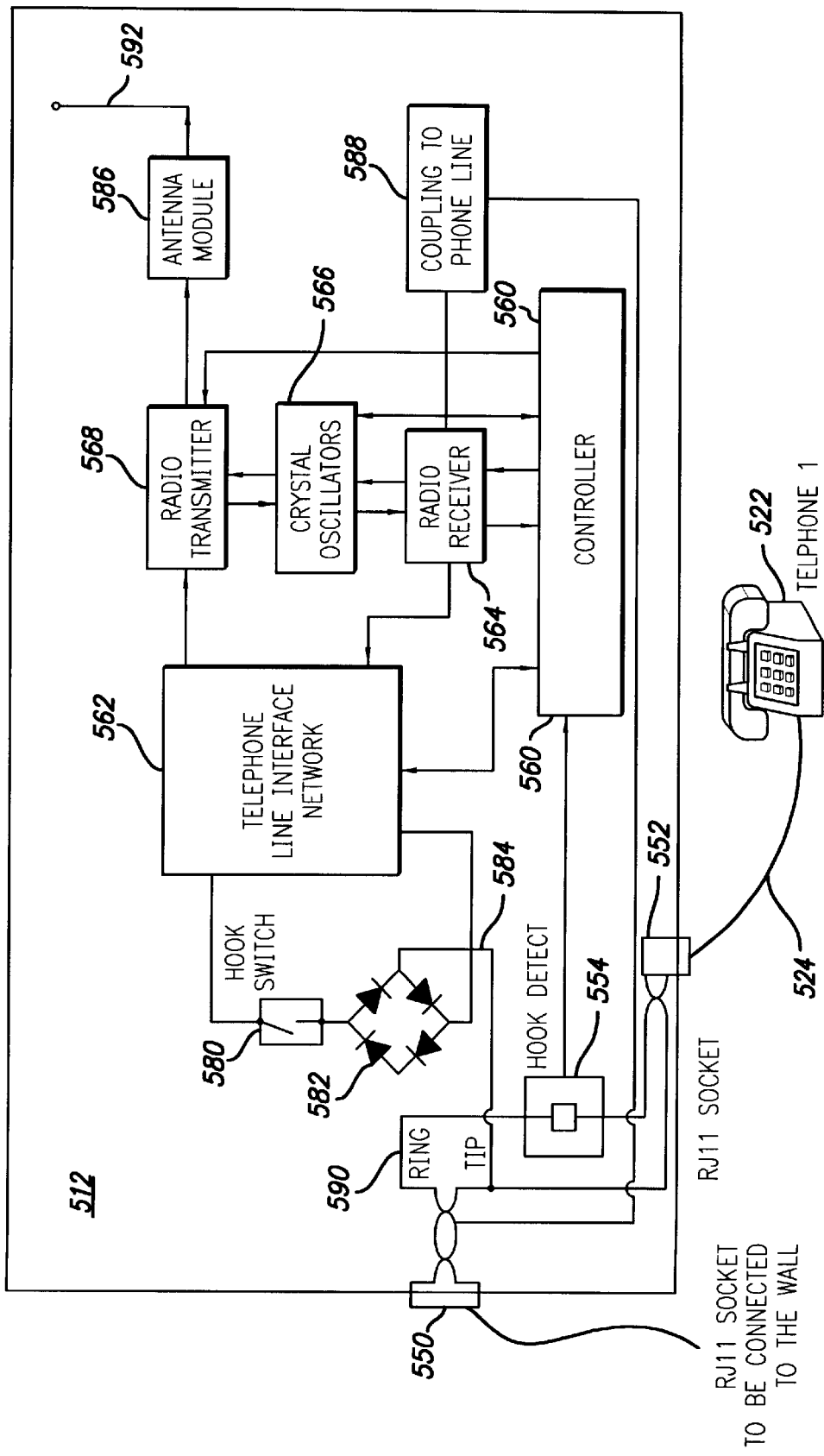
FIG. 8 is block schematic component diagram of the line interface transceiver shown in FIGS. 6 and 7.
Figure 9:
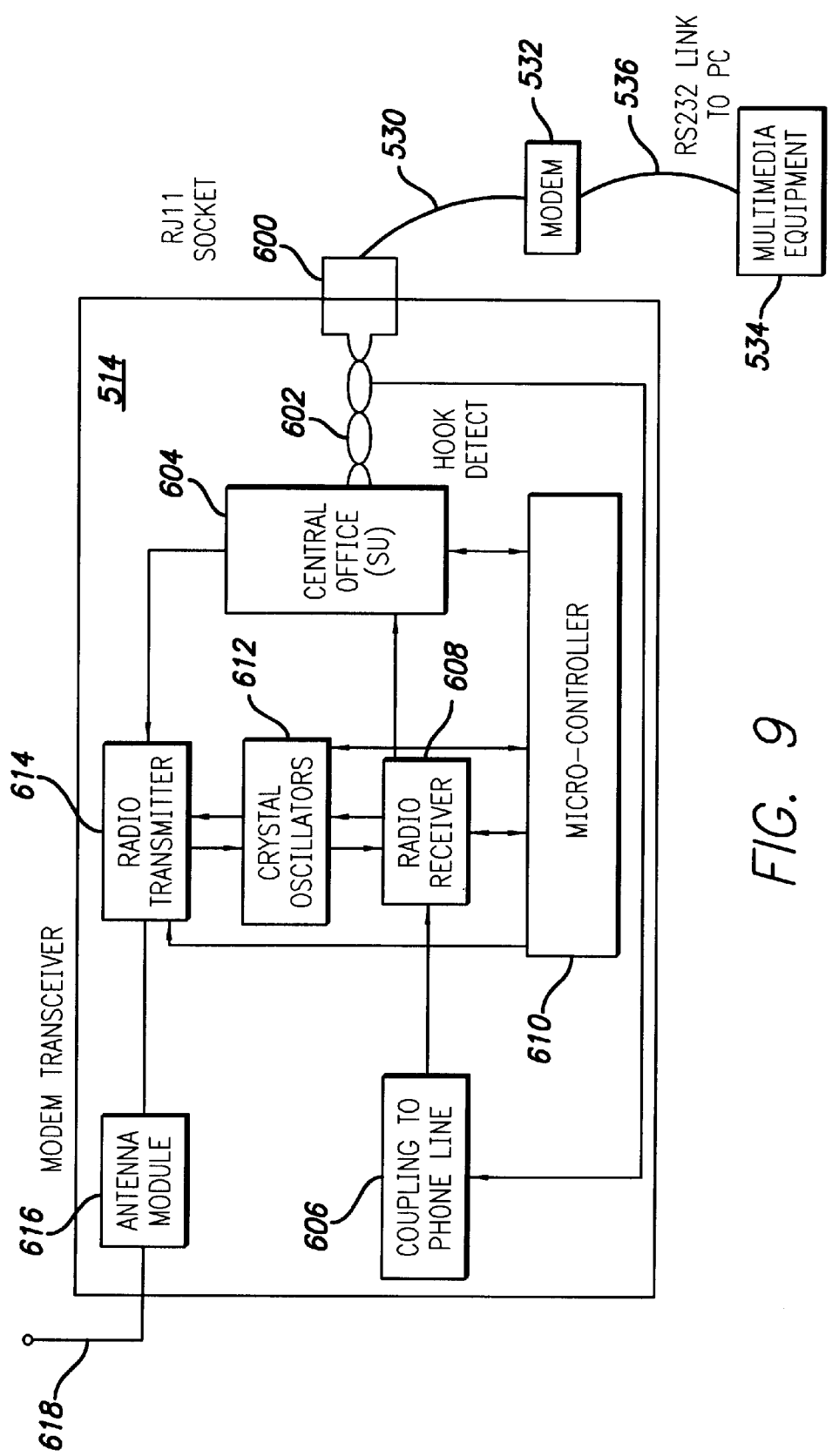
FIG. 9 is a schematic block component diagram of the modem transceiver of FIGS. 6 and 7.

In FIG. 7, the internal components of the line interface module 512 and the modem interface module 514 are shown.

The line interface module or transceiver 512 has an RJ11 socket 550 providing an RJ-11 connection to the local telephone switching system. A second RJ11 socket 552 allows connection of a telephone 522 via cable 524 to the line interface transceiver 512. An off hook detection circuit 554 determines the state of the telephone 522 and usurps all control of the line interface transceiver 512 when the telephone 522 is off hook. This allows the immediate use of the telephone 522, particularly under emergency circumstances.

In the line interface transceiver 512, a controller 560 is coupled or connected to the hook detect switch 554, the telephone line interface network 562, the radio receiver 564, the crystal oscillator 566, and the radio transmitter 568.

The telephone line interface network 562 is coupled to a hook switch 580 and a diode bridge 582. The diode bridge 582 is additionally coupled to the tip line 584 to establish one-half of the closed phone-line connection that must occur for there to be a complete circuit and telephonic communications. The telephone line interface network 562 is also coupled to the radio transmitter 568 and the radio receiver 564.

The radio transmitter 568 is coupled to the crystal oscillators 566 as well as the antenna module 586. The crystal oscillators 566 are coupled to both the radio transmitter 568 and the radio receiver 564.

The radio receiver 564 is coupled to the antenna module 586 as well as to the coupling to the phone-line 588. The coupling to the phone-line 588 is coupled to the ring line 590 to establish the other half of the closed loop telephone connection.

The antenna module 586 is connected to an antenna 592 that transmits and receives radio waves according to the signals impressed upon the antenna 592.

The line interface transceiver/module 512 uses the controller 560 to control the operations of the line interface transceiver 512. The controller 560 coordinates the operation of the individual elements of the line interface transceiver 512 in order to ensure coordinated communication that preserves the integrity of the data involved. The telephone line interface network 562 provides the appropriate interface to the telephone line to and from the radio transmitter 568 and the radio receiver 564. The hook switch 580 establishes the phone-line connection for incoming and outgoing calls related to the modem transceiver 514. The diode bridge 582 provides appropriate current and voltage flow as required by the line interface transceiver 512.

The radio transmitter 568 transmits radio frequency signals to the antenna module 586 so that they may be radiated out by the antenna 592. The crystal oscillators 566 may provide a number of channels available for the radio transmitter 568 and receiver 564 according to the requirements, conveniences, or demands of the wireless phone-line interface system 510. The crystal oscillators 566 provide the necessary radio frequencies for driving the radio transmitter 568 and providing the appropriate filter frequencies for the radio receiver 564. The radio receiver 564 receives signals from the attached antenna module 586 and in conjunction with the telephone line interface network 562 and the coupling to the phone-line 588, transmits such signals to the associated telephone network and central switching office.

The elements set forth in the line interface receiver 512 are believed to be known in the art individually; however, their combination to establish a wireless phone-line interface is believed not to have been previously seen in the art.

The modem transceiver 514 is similar to the line interface transceiver 512 save that it does not require the interface circuitry for a telephone line and substitutes for that, interface circuitry for the modem 532.

In the modem transceiver 514, an RJ11 socket 600 provides the connection via cable 530 to the modem 532. A pair of twisted wires or the like 602 carries the signals to and from the RJ11 socket 600 via the central office subscriber line interface 604. A single one of the twisted wire pair 602 is connected to a coupling to phone-line 606 which in turn is connected to the radio receiver 608.

A micro controller 610 is connected to the central office/subscriber line interface 604, the radio receiver 608, the crystal oscillators 612, and the radio transmitter 614.

The central office/subscriber line interface 604 is also connected to the radio transmitter 614 and the radio receiver 608. The crystal oscillators 612 are also coupled to the radio transmitter 614 and the radio receiver 608.

The radio transmitter 614 and the radio receiver 608 are both coupled to the antenna module 616 which in turn is connected to the antenna 618.

The antenna 618 receives and radiates radio frequency signals. The radio transmitter 614 in conjunction with the crystal oscillators 612 drive the antenna module 616 with radio frequency signals that are transmitted by the antenna module 616 to the antenna 618. The antenna 618 then radiates radio signals for reception by the line interface transceiver 512. The antenna 618 also receives radio frequency signals transmitted by the line interface transceiver 512 for transmission to the antenna module 616 and on to the radio receiver 608.

The central office/subscriber line interface 604 is seen by the modem 532 as a regular telephone line to which such modems are commonly connected. Consequently, the modem transceiver 514 appears for all intents and purposes the same as a telephonic connection to a central telephone switching office. As the modem transceiver 514 is the element of the wireless phone-line interface system of the present invention seen by the modem 532, the entire wireless phone-line interface system 510 of the present invention appears for all intents and purposes to the modem 532 as a telephone loop connection to a central office, albeit with possible differences arising from the exchange of radio signals between the modem transceiver 514 and the line interface transceiver 512. As a whole, the wireless phone-line interface of the present invention appears transparent to both the modem 532 and the associated telephone line.

Similar to the controller 560 of the line interface transceiver 512, the micro controller 610 of the modem transceiver 514 controls the operation of the modem transceiver 514 so that modem and radio signals may be exchanged between the computer equipment 534 and the line interface transceiver 512 with its attached phone-line connection. The crystal oscillators 612 serve to provide the frequencies at which the radio transmitter 614 must transmit its signals as well as the frequencies needed to filter out the carrier wave received by the radio receiver 608.

For all practical purposes, the radio transmission and receiving portions of both the modem transceiver 514 and the line interface transceiver 512 are similar save that the radio transmitter 568 of the line interface transceiver 512 transmits at frequencies picked up by the radio receiver 608 of the modem transceiver 514. The radio transmitter 614 of the modem transceiver 514 transmits at frequencies received by the radio receiver 564 of the line interface transceiver 512. The up-link frequency $F_1$ used to transmit from the line interface transceiver 512 to the modem interface transceiver 514 is different from the down-link frequency $F_2$ used to transmit the signals from the modem interface transceiver 514 to the line interface transceiver 512. By using different frequencies, the present invention achieves full duplex communications.

Having generally described the construction of the wireless phone-line interface system of the present invention as manifested in the description of FIGS. 6–9 above, one embodiment of the operation of the present invention is set forth below.

As mentioned above, the purpose of the wireless phone-line interface is to provide a wireless communication link for full duplex data communication between a modem and the telephone socket connected to the central telephone switching office.

A typical connection between the modem and the central office is shown in FIG. 6 when the wireless phone-line interface system of the present invention is implemented. With the wireless link, the physical placement of the modem is no longer constrained by the proximity or length of the cable connecting the modem to the telephone socket on the wall. In fact, it removes any need to run such a wire between the modem and the telephone socket.

The elimination of a need for the wire arises from the use of the two modules at either side of the wireless connection establishing communication between the telephone wall socket (and its accompanying central telephone office switching network) and the modem. The transceiver connected to the wall socket is designated the line interface transceiver 512 and establishes the connection with the telephone socket and associated switching network. The modem transceiver 514 establishes the connection with the modem 532. As the modem transceiver 514 and line interface transceiver 512 communicate without a wire between one another, the physical location of the modem 532 is no longer constrained by a wire or cable.

The line interface transceiver 512 provides the interface to the central office (or to the PBX). The line interface transceiver 512 has a radio transmitter 568 and a radio receiver 564 for establishing a full duplex wireless link between itself and a modem transceiver 514. An additional telephone socket 552 is available for connecting an external telephone 522 so that both the modem 532 and the telephone 522 can share the same telephone socket. The telephone 522 is connected by the regular telephone cable having RJ11 or other connection means.

The modem transceiver 514 is similar in design to the line interface transceiver 512 with respect to the transmitting and receiving aspects and elements. Additionally, the modem transceiver 514 is connected to the modem 532 through the subscriber line interface (SLI) 604. The SLI 604 mimics the function of the central telephone office in the subscriber loop so that the connection between itself and the modem 532 is possible using a standard telephone line having RJ11 plugs or sockets so that the modem 532 is connected to the modem transceiver 514. Both the modem transceiver 514 and the line interface transceiver 512 are powered by a 110 volt power line supply intermediated by an adapter or the like as needed. The adapter module 520 should be small enough to be plugged into an existing line socket with the additional facility of providing a courtesy socket so that an electrical power socket is not lost by the use of the wireless phone-line interface adapter module. In one embodiment, the 110 volt power adapter module 520 is secured by screws or the like to a face plate of the socket or the like so that it will not be pulled off accidentally to disable the wireless connection.

When an incoming call is received by the line interface module 512 it may either be a person calling desiring to establish a voice connection or FSK (frequency shift keying) data seeking to establish a connection with the modem 532. In one embodiment, the line interface module 512 may only establish a connection with the modem transceiver 514 when ten rings have occurred and the associated telephone 522 has been left on hook and unanswered.

In establishing the wireless link between the line interface transceiver 512 and the modem transceiver 514, all available channels (in one embodiment, 10) are scanned before establishing the wireless communication between the line interface transceiver 512 and the modem transceiver 514. The clearest or first available channel may be selected by the transceivers. The transceiver initiating transmission (whether it be the line interface transceiver 512 or the modem transceiver 514) may scan the radio channels for free channels for full duplex communications between the transceivers. The transceiver that does not initiate transmission may be set in a listening mode, scanning its available receiving frequencies for an activation signal.

To conserve power, transmission from either transceiver will be cut if either the initiating or responding modem goes on hook (hangs up, terminates the call).

The connection of the telephone 522 with the line interface transceiver 512 has priority over all communications. Consequently, the line interface module 512 will immediately disconnect the modem 532 from the telephone line if the telephone 522 goes off hook.

When the modem 532 initiates a call to the modem transceiver 514, the modem generates an off hook signal to the subscriber line interface (SLI) 604. The SLI subsequently initiates handshaking between the modem transceiver 514 and the line interface transceiver 512 to establish the channels for transception of signals between the two modules. The communication between the line interface transceiver 512 and the modem transceiver 514 is on a one-to-one basis in that only one module can be talking to another and in that the line interface transceiver 512 only transceives signals with a single modem transceiver 514 (and vice versa).

Once the line interface transceiver 512 receives signals from the modem transceiver 514, the telephone line interface network 562 takes control of the telephone line for transmission and reception of the modem data.

The line interface module 512 only makes outgoing calls for the modem transceiver 514 and the modem 532 if the telephone line is currently not used by the telephone 522 connected to the line interface transceiver 512. If the line interface transceiver 512 is currently engaged in a modem 532 call, taking the telephone 522 off hook immediately terminates the modem connection. The person then using the telephone will get a dial tone and may make an outgoing call, an important aspect under emergency conditions. The telephone 522 has absolute priority over the modem connection.

The technical specifications of the wireless phone-line interface are as follows. The line interface transmitter 568 transmits at frequencies in the 46 MHz band (or other band in the 900 or 2.4 Ghz range). Consequently, the modem transceiver 608 receives at the same frequencies. Likewise, the line interface receiver 564 receives signals in the 49 MHz band. (or other band in the 900 or 2.4 Ghz range). Consequently, the modem transceiver radio transmitter 614 also transmits in this frequency band. The radiated power by the antennas 592, 618 is on the order of typically 10 mW, or trimmed to permissible level. The signals transmitted by the antennas may be frequency modulated (FM). Ten channels of full duplex communication may be incorporated into the transceiving modules 512, 514. However, fewer or more channels may be used according to manufacturer, user, or distributor preferences or in light of government regulations. The bandwidth of the channels used may be determined as appropriate for the conditions under which the wireless phone-line interface of the present invention operates. One data rate at which the wireless phone-line interface 510 of the present invention may operate is at 300 baud. However, otherhigher data rates may also be used depending on the frequency range being used.

A loop interface in the modem is preferably constructed according to CCITT and Bell Telephone standards as well as meeting FCC Regulations, including Part 68. With respect to the interface loop in the line interface transceiver 512 interfacing to the central office, the loop current I line operates (in one embodiment) preferably at 35 mA at a 10 volt voltage line. The loop voltage V line may operate at 4.5 volts at a 15 mA current line. However, these current and voltage characteristics may change according to embodiments used in actual practice. The loop interface for the central telephone office interface may be constructed and operated according to CCITT and Bell Telephone standards.

The modem transceiver 514 DC power supply may typically be 48 volts to meet all CCITT standards for central telephone offices and the like. However, this DC power supply may be lower if it is not necessary to conform to CCITT standards. The line interface transceiver 512 DC power supply may typically be 5 volts.

While the present invention has been described with regards to particular embodiments, it is recognized that additional variations of the present invention may be devised without departing from the inventive concept.

For example, multiple-frequency receiving units can be built into rooms and buildings to provide a ready infrastructure for wireless modem systems consistent with the present invention. Likewise, if industry or known standards are available or established, electronic information equipment such as laptop computers and the like could have pre-installed wireless transceiving systems that interface with such wireless-ready rooms and buildings. The discrete elements of the present invention could be pre-installed on both sides of the wireless link.

Additionally, the phone line link could be replaced by a high-bandwidth connection to the Internet or other electronic information exchange. Such a high-bandwidth connection might itself incorporate a variety of transmission media including satellite uplinks.

What is claimed is:

1. A wireless phone-line interface system for establishing a wireless connection between a modem and a telephone switching network, comprising:
    a line interface transceiver coupled to the telephone switching network, said line interface transceiver transmitting and receiving wireless signals;
    a modem transceiver coupled to the modem, said modem transceiver transmitting and receiving wireless signals to and from said line interface transceiver;
    a line transmitter for transmitting wireless audio signals to said modem transceiver;
    a line receiver for receiving wireless audio signals from said modem transceiver; and
    a line sensing and isolation circuit, said line sensing and isolation circuit coupled on a first side to at least one telephone jack and coupled on a second side to said line transmitter and said line receiver, said line sensing and isolation circuit sensing activity on the telephone switching network and terminating a connection between said line transmitter and said line receiver if a handset coupled to said line interface transceiver is taken off hook; whereby
    modem signals may be exchanged between the modem and the telephone switching network via said line interface transceiver and said modem transceiver.

2. The wireless phone line interface system for establishing a wireless connection between a modem and a telephone switching network of claim 1, wherein said line interface transceiver further comprises:
    a line oscillation circuit coupled to said line transmitter and said line receiver, said line oscillation circuit providing frequency signals to said line transmitter and said line receiver; and
    a line antenna, said line antenna coupled to said line transmitter and said line receiver, said line antenna transmitting line transmitter signals to said modem transceiver, said line antenna receiving modem transceiver signals from said modem transceiver; whereby audio/analog signals are transceived by said line interface transceiver with said modem transceiver to couple said modem with said telephone switching network.

3. The wireless phone line interface system for establishing a wireless connection between a modem and a telephone switching network of claim 2, wherein said line interface transceiver further comprises:
    a duplexor, said duplexor coupled between said line antenna on a first side and said line transmitter and said line receiver on a second side, said duplexor coordinating and controlling simultaneous two-way communication over said line antenna so that the modem may operate in full duplex.

4. The wireless phone line interface system for establishing a wireless connection between a modem and a telephone switching network of claim 3, wherein said line interface transceiver further comprises:
    a cloning circuit, said cloning circuit coupled to said line oscillation circuit and said line transmitter and said line receiver, said cloning circuit having a jack to which said modem transceiver may be coupled, said cloning circuit recognizing and identifying said modem transceiver to prevent unauthorized interception of signals exchanged between said line interface transceiver and said modem transceiver.

5. The wireless phone line interface system for establishing a wireless connection between a modem and a telephone switching network of claim 4, wherein said cloning circuit further comprises:
    a microcontroller for processing instructions, said microcontroller coupled to said line transmitter and said line receiver;
    a memory for storing data, said memory coupled to said microcontroller; and
    instructions in the form of software directing activities of said microcontroller; whereby
    said microcontroller polls, queries, and identifies a modem transceiver coupled to said cloning jack, said line interface transceiver transmitting address information to said modem transceiver to prevent illegal cloning of a modem transceiver.

6. The wireless phone line interface system for establishing a wireless connection between a modem and a telephone switching network of claim 2, wherein said line oscillation circuit further comprises:
    a crystal oscillator; and
    a phase locked loop (PLL), said PLL coupled to said crystal oscillator on a first side and said transmitter and said receiver on a second side.

7. The wireless phone line interface system for establishing a wireless connection between a modem and a telephone switching network of claim 1, wherein said modem transceiver further comprises:
    a modem transmitter for transmitting wireless audio signals to said line interface transceiver;
    a modem receiver for receiving wireless audio signals from said line interface transceiver;

a modem oscillation circuit coupled to said modem transmitter and said modem receiver, said modem oscillation circuit providing frequency signals to said modem transmitter and said modem receiver; and a modem antenna, said modem antenna coupled to said modem transmitter and said modem receiver, said modem antenna transmitting modem transmitter signals to said line interface transceiver, said modem antenna receiving line interface transceiver signals from said line interface transceiver; whereby audio/analog signals are transceived by said modem transceiver with said line interface transceiver to couple said modem with said telephone switching network.

8. The wireless phone line interface system for establishing a wireless connection between a modem and a telephone switching network of claim 7, wherein said modem transceiver further comprises:

a duplexor, said duplexor coupled between said modem antenna on a first side and said modem transmitter and said modem receiver on a second side, said duplexor coordinating and controlling simultaneous two-way communication over said modem antenna so that the modem may operate in full duplex.

9. The wireless phone line interface system for establishing a wireless connection between a modem and a telephone switching network of claim 8, wherein said modem transceiver further comprises:

a cloning circuit, said cloning circuit coupled to said modem oscillation circuit, said modem transmitter, and said modem receiver, said cloning circuit having a jack to which said line interface transceiver may be coupled, said cloning circuit indicating and identifying said modem transceiver to said line interface transceiver to prevent unauthorized interception of signals exchanged between said modem transceiver and said line interface transceiver.

10. The wireless phone line interface system for establishing a wireless connection between a modem and a telephone switching network of claim 9, wherein said cloning circuit further comprises:

a microcontroller for processing instructions, said microcontroller coupled to said modem transmitter and said modem receiver;

a memory for storing data, said memory coupled to said microcontroller; and instructions in the form of software directing activities of said microcontroller; whereby said microcontroller identifies said modem transceiver to said line interface transceiver, said line interface transceiver transmitting address information to said modem transceiver to prevent cloning.

11. The wireless phone line interface system for establishing a wireless connection between a modem and a telephone switching network of claim 7, wherein said modem oscillation circuit further comprises:

a crystal oscillator; and a phase locked loop (PLL), said PLL coupled to said crystal oscillator on a first side and said transmitter and said receiver on a second side.

12. The wireless phone line interface system for establishing a wireless connection between a modem and a telephone switching network of claim 7, wherein said modem transceiver further comprises:

a telephone line simulator circuit, said telephone line simulator circuit sensing signals from said line interface transceiver indicating an incoming call and establishing the proper off hook signals for the modem coupled to said telephone line simulator circuit, said telephone line simulator circuit coupled on a first side to the modem and coupled on a second side to said modem transmitter and said modem receiver.

13. A wireless phone-line interface system for establishing a wireless connection between a modem and a telephone switching network, comprising:

a line interface transceiver coupled to the telephone switching network, said line interface transceiver transmitting and receiving wireless signals;

a modem transceiver coupled to the modem, said modem transceiver transmitting and receiving wireless signals to and from said line interface transceiver;

said line interface transceiver having:

a line transmitter for transmitting wireless audio signals to said modem transceiver;

a line receiver for receiving wireless audio signals from said modem transceiver;

a line oscillation circuit coupled to said line transmitter and said line receiver, said line oscillation circuit providing first frequency signals to said line transmitter and said line receiver, said line oscillation circuit having:

a first crystal oscillator; and a first phase locked loop (PLL), said first PLL coupled to said first crystal oscillator on a first side and said line transmitter and said line receiver on a second side;

a line antenna, said line antenna coupled to said line transmitter and said line receiver, said line antenna transmitting line transmitter signals to said modem transceiver, said line antenna receiving modem transceiver signals from said modem transceiver, said line antenna hidden or camouflaged;

a first duplexor, said first duplexor coupled between said line antenna on a first side and said line transmitter and said line receiver on a second side, said first duplexor coordinating and controlling simultaneous two-way communication over said line antenna so that the modem may operate in full duplex;

a first cloning circuit, said first cloning circuit coupled to said line oscillation circuit and said line transmitter and said line receiver, said first cloning circuit having a first cloning jack to which said modem transceiver may be coupled, said first cloning circuit recognizing and identifying said modem transceiver to prevent unauthorized interception of signals exchanged between said line interface transceiver and said modem transceiver, said first cloning circuit having:

a first microcontroller for processing instructions, said first microcontroller coupled to said line transmitter and said line receiver;

a first memory for storing data, said memory coupled to said microcontroller; and first instructions in the form of software directing activities of said microcontroller; whereby said first microcontroller polls, queries, and identifies a modem transceiver coupled to said first cloning jack, said line interface transceiver transmitting address information to said modem transceiver to prevent illegal cloning of a modem transceiver; and a line sensing and isolation circuit, said line sensing and isolation circuit coupled on a first side to at least one telephone jack and coupled on a second side to said line transmitter and said line receiver, said line sensing and isolation circuit sensing activity on the telephone switching network; whereby audio/analog signals are transceived by said line interface transceiver with said modem transceiver to couple said modem with said telephone switching network; and said modem transceiver having:

a modem transmitter for transmitting wireless audio signals to said line interface transceiver;

a modem receiver for receiving wireless audio signals from said line interface transceiver;

a modem oscillation circuit coupled to said modem transmitter and said modem receiver, said modem oscillation circuit providing frequency signals to said modem transmitter and said modem receiver, said modem oscillation circuit having:

a second crystal oscillator; and a second phase locked loop (PLL), said second PLL coupled to said second crystal oscillator on a first side and said modem transmitter and said modem receiver on a second side;

a modem antenna, said modem antenna coupled to said modem transmitter and said modem receiver, said modem antenna transmitting modem transmitter signals to said line interface transceiver, said modem antenna receiving line interface transceiver signals from said line interface transceiver, said modem antenna hidden or camouflaged;

a second duplexor, said second duplexor coupled between said modem antenna on a first side and said modem transmitter and said modem receiver on a second side, said second duplexor coordinating and controlling simultaneous two-way communication over said modem antenna so that the modem may operate in full duplex;

a second cloning circuit, said second cloning circuit coupled to said modem oscillation circuit, said modem transmitter, and said modem receiver, said second cloning circuit having a jack to which said line interface transceiver may be coupled, said second cloning circuit indicating and identifying said modem transceiver to said line interface transceiver to prevent unauthorized interception of signals exchanged between said modem transceiver and said line interface transceiver, said second cloning circuit having:

a second microcontroller for processing instructions, said second microcontroller coupled to said modem transmitter and said modem receiver;

a second memory for storing data, said second memory coupled to said second microcontroller; and second instructions in the form of software directing activities of said second microcontroller; whereby said second microcontroller identifies said modem transceiver to said line interface transceiving, said line interface transceiver transmitting address information to said modem transceiver to prevent cloning; and a telephone line simulator circuit, said telephone line simulator circuit sensing signals from said line interface transceiving indicating an incoming call, said telephone line simulator circuit separately establishing the proper off hook signals for the modem coupled to said telephone line simulator circuit, said telephone line simulator circuit coupled on a first side to the modem and coupled on a second side to said modem transmitter and said modem receiver; whereby audio/analog signals are transceived by said modem transceiver with said line interface transceiver to couple said modem with said telephone switching network; whereby modem signals may be exchanged between the modem and the telephone switching network via said line interface transceiver and said modem transceiver.

14. A wireless phone-line interface system for establishing a wireless connection between a modem and a telephone switching network, comprising:

a line interface transceiver coupled to the telephone switching network, said line interface transceiver transmitting and receiving wireless signals, said line interface transceiver having a line transmitter, a line receiver, a line oscillation circuit, a line antenna, and a cloning circuit;

a modem transceiver coupled to the modem, said modem transceiver transmitting and receiving wireless signals to and from said line interface transceiver;

said line transmitter transmitting wireless audio signals to said modem transceiver;

said line receiver receiving wireless audio signals from said modem transceiver;

said line oscillation circuit coupled to said line transmitter and said line receiver, said line oscillation circuit providing frequency signals to said line transmitter and said line receiver;

said line antenna coupled to said line transmitter and said line receiver, said line antenna transmitting line transmitter signals to said modem transceiver, said line antenna receiving modem transceiver signals from said modem transceiver; and said cloning circuit coupled to said line oscillation circuit and said line transmitter and said line receiver, said cloning circuit having a jack to which said modem transceiver may be coupled, said cloning circuit recognizing and identifying said modem transceiver to prevent unauthorized interception of signals exchanged between said line interface transceiver and said modem transceiver; whereby modem signals may be exchanged between the modem and the telephone switching network via said line interface transceiver and said modem transceiver.

15. The wireless phone line interface system for establishing a wireless connection between a modem and a telephone switching network of claim 14, wherein said cloning circuit further comprises:

a microcontroller for processing instructions, said microcontroller coupled to said line transmitter and said line receiver;

a memory for storing data, said memory coupled to said microcontroller; and instructions in the form of software directing activities of said microcontroller; whereby said microcontroller polls, queries, and identifies a modem transceiver coupled to said cloning jack, said line interface transceiver transmitting address information to said modem transceiver to prevent illegal cloning of a modem transceiver.

16. A wireless phone-line interface system for establishing a wireless connection between a modem and a telephone switching network, comprising:

a line interface transceiver coupled to the telephone switching network, said line interface transceiver transmitting and receiving wireless signals;

a modem transceiver coupled to the modem, said modem transceiver transmitting and receiving wireless signals to and from said line interface transceiver, said modem transceiver having a modem transmitter, a modem receiver, a modem oscillation circuit, a modem antenna, and a cloning circuit;

said modem transmitter transmitting wireless audio signals to said line interface transceiver;

said modem receiver receiving wireless audio signals from said line interface transceiver;

said modem oscillation circuit coupled to said modem transmitter and said modem receiver, said modem oscillation circuit providing frequency signals to said modem transmitter and said modem receiver;

said modem antenna coupled to said modem transmitter and said modem receiver, said modem antenna transmitting modem transmitter signals to said line interface transceiver, said modem antenna receiving line interface transceiver signals from said line interface transceiver;

said cloning circuit coupled to said modem oscillation circuit, said modem transmitter, and said modem receiver, said cloning circuit having a jack to which said line interface transceiver may be coupled, said cloning circuit indicating and identifying said modem transceiver to said line interface transceiver to prevent unauthorized interception of signals exchanged between said modem transceiver and said line interface transceiver; whereby modem signals may be exchanged between the modem and the telephone switching network via said line interface transceiver and said modem transceiver.

17. The wireless phone line interface system for establishing a wireless connection between a modem and a telephone switching network of claim 16, wherein said cloning circuit further comprises:

a microcontroller for processing instructions, said microcontroller coupled to said modem transmitter and said modem receiver;

a memory for storing data, said memory coupled to said microcontroller; and instructions in the form of software directing activities of said microcontroller; whereby said microcontroller identifies said modem transceiver to said line interface transceiver, said line interface transceiver transmitting address information to said modem transceiver to prevent cloning.

* * * * *